(12) United States Patent
Graham, Jr.

(10) Patent No.: US 6,308,800 B1
(45) Date of Patent: Oct. 30, 2001

(54) ADAPTABLE TREE STAND FOR HUNTING WITH BOW AND ARROWS AND WITH RIFLE

(76) Inventor: Thomas E. Graham, Jr., P.O. Box 7127, Wilmington, NC (US) 28406

( * ) Notice: Subject to any disclaimer, the term of this patent is extended or adjusted under 35 U.S.C. 154(b) by 0 days.

(21) Appl. No.: 09/368,935

(22) Filed: Aug. 5, 1999

(51) Int. Cl.[7] ............................... A63B 27/00; E04G 3/00
(52) U.S. Cl. ............................................. 182/136; 182/187
(58) Field of Search ........................... 182/116, 133–136, 182/187, 188

(56) References Cited

U.S. PATENT DOCUMENTS

| 4,236,602 | * | 12/1980 | Leggett | 182/187 |
|---|---|---|---|---|
| 4,369,858 | * | 1/1983 | Babb | 182/134 |
| 5,316,104 | * | 5/1994 | Amacker | 182/187 |
| 5,641,036 | * | 6/1997 | Maxwell | 182/135 |
| 5,775,464 | * | 7/1998 | Gardner | 182/187 |
| 5,971,104 | * | 10/1999 | Woller | 182/136 |

\* cited by examiner

*Primary Examiner*—Jerry Redman
*Assistant Examiner*—Hugh B. Thompson
(74) *Attorney, Agent, or Firm*—MacCord Mason PLLC

(57) ABSTRACT

A tree stand with a foot climber section having tree grippers, and a foot rest; a seat climber section with a rear end and a front end, tree grippers, tubular side members with front and rear ends, and inserts slidably in the side members between extended and retracted positions; and a seat releasably attachable to the inserts when the inserts are in the extended position, and releasably attachable to the seat climber tubular side members when the inserts are in the retracted position.

11 Claims, 4 Drawing Sheets

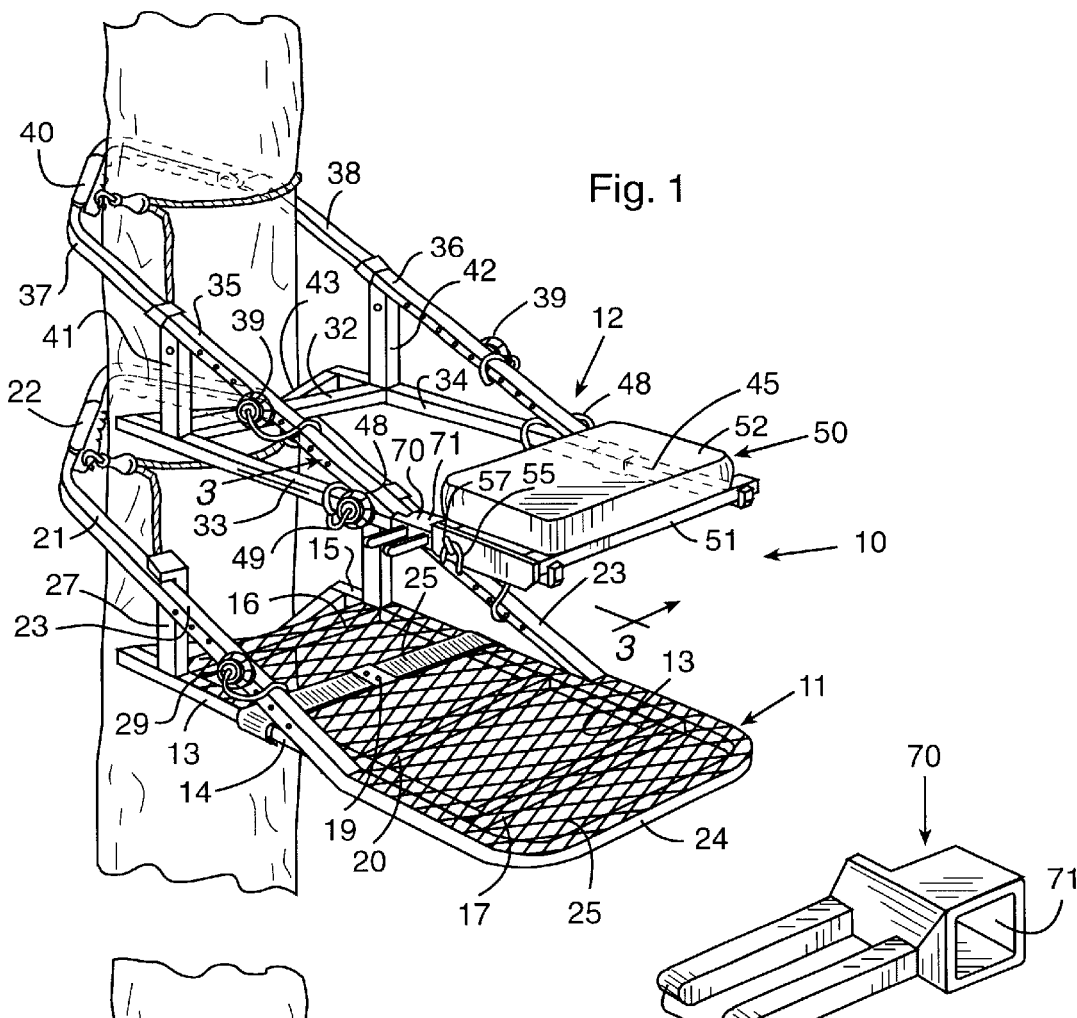
Fig. 1
Fig. 5
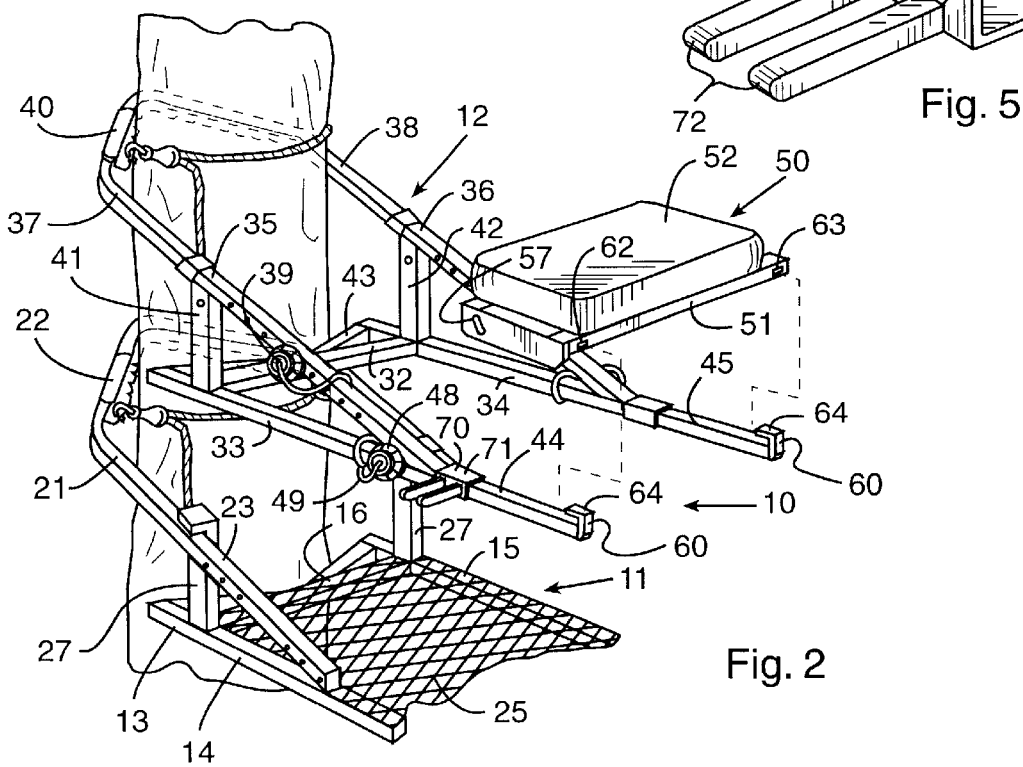
Fig. 2

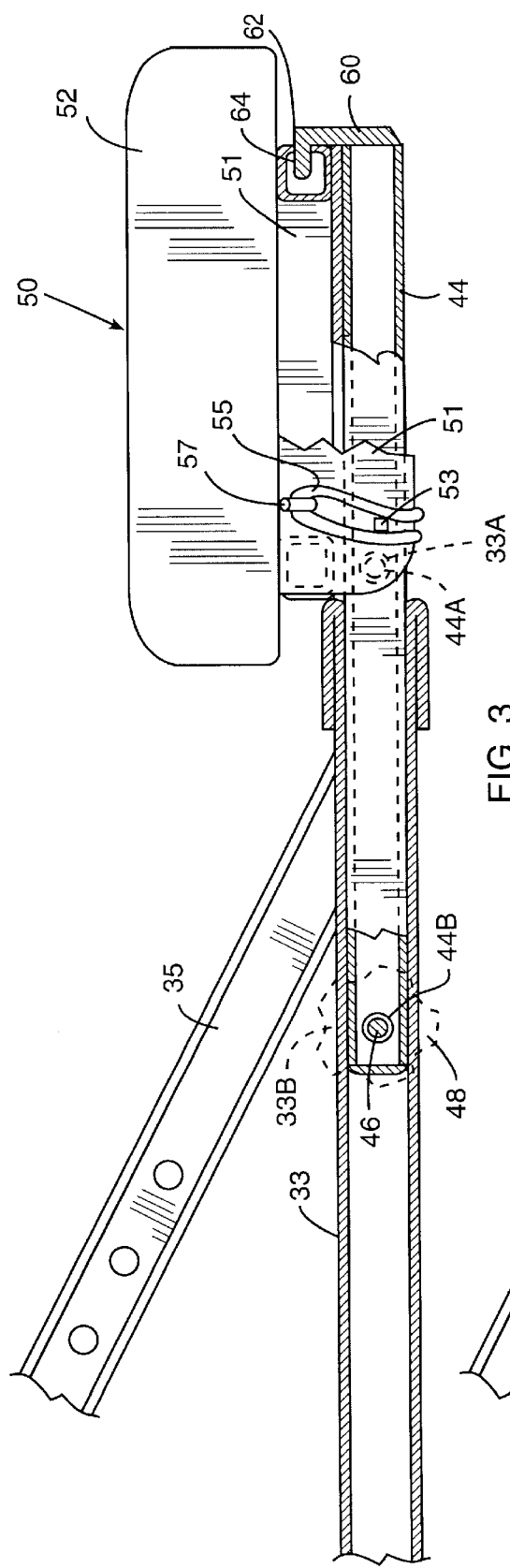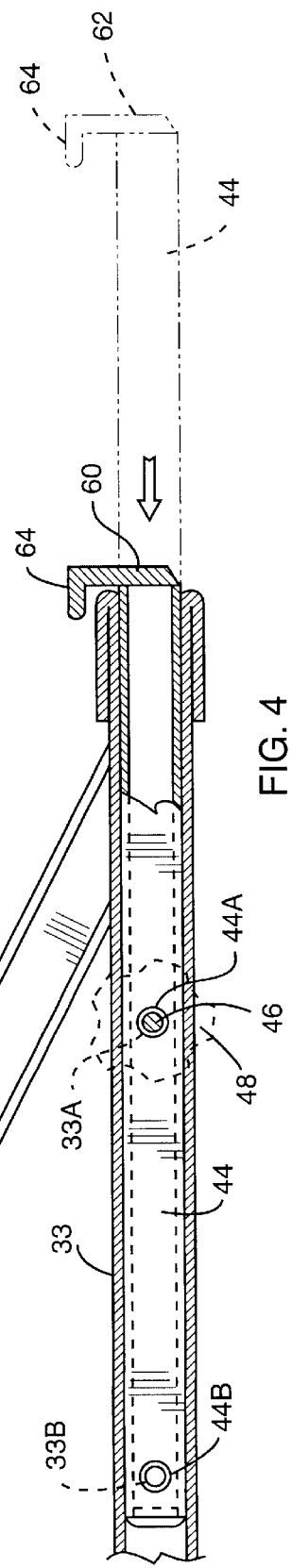

ADAPTABLE TREE STAND FOR HUNTING WITH BOW AND ARROWS AND WITH RIFLE

FIELD OF THE INVENTION

The invention relates to a tree stand with a seat that is adjustable in location to make the tree stand adaptable for hunting with bow and arrows or a rifle by advantageously and easily changing the location of the seat while hunting.

BACKGROUND OF THE INVENTION

Tree stands that are adaptable for hunting with bow and arrows are known. See, for example, U.S. Pat. No. 5,316,104 to Amacker, and U.S. Pat. No. 4,236,602 to Leggett.

Amacker provides a seating section with a cross member on the tree stand. The cross member can be removed and replaced in a vertical orientation at the side of the tree stand to provide space for hunting with bow and arrows.

Leggett provides a pivotal seat that can be moved to a vertical position at the front of the tree stand to provide space for hunting with bow and arrows.

Neither Amacker or Leggett disclose or suggest applicant's concept of providing a seat that can be positioned on a tree stand for use while hunting with a rifle and easily repositioned while the tree stand is in use to provide seating and space for hunting with bow and arrows.

SUMMARY OF THE INVENTION

The tree stand has a foot climber and a seat climber that are to be used by a hunter in a conventional manner to climb a tree. The seat climber has a removable seat and tubular sleeves with retractable inserts that can be retracted within their sleeves and the seat positioned on the sleeves in close proximity to the tree to obtain unobstructed space and view for an archer or bow hunter. The retractable inserts can be extended and the seat repositioned on the inserts in outwardly spaced relation to the tree, so the hunter faces the tree when seated. The seat is positioned closer to the tree for an archer, who can sit with his back to the tree.

BRIEF DESCRIPTION OF THE DRAWINGS

FIG. 1 is a perspective view of the tree stand with the foot climber and the seat climber encircling a tree shown in phantom lines with the seat supported on retractable inserts in their extended position;

FIG. 2 is a perspective view similar to FIG. 1 but with parts broken away and schematically showing the seat positioned for attachment to the retractable inserts;

FIG. 3 is a longitudinal sectional view taken substantially along the line 3—3 in FIG. 1;

FIG. 4 is a longitudinal sectional view similar to FIG. 3, but showing in solid lines one of the retractable inserts in its retracted position and showing the same insert in phantom lines in its extended position;

FIG. 5 is a perspective view of a bow holder, removed from the tree stand;

DETAILED DESCRIPTION OF THE INVENTION

Figure 6:
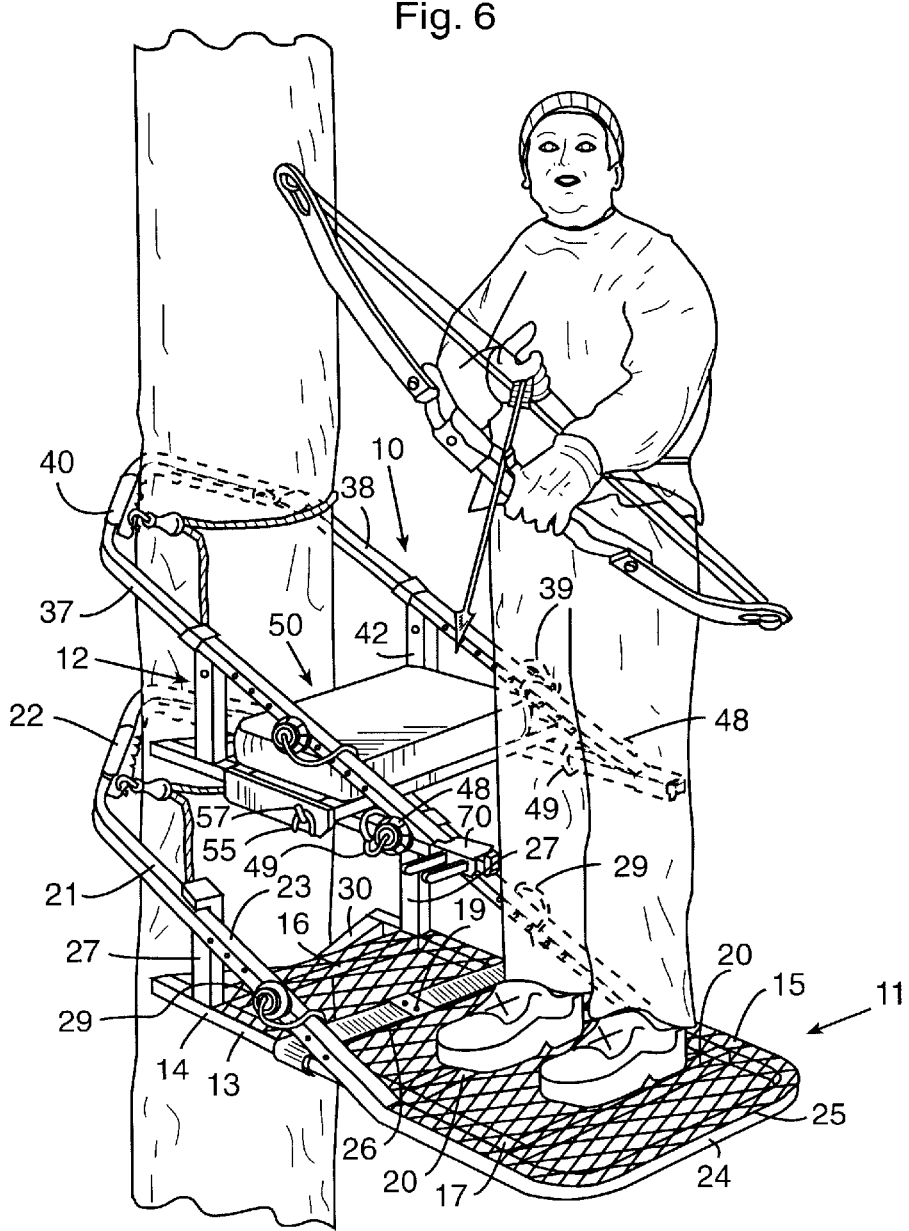
FIG. 6 is a perspective view of the tree stand adapted for the use by an archer with the retractable inserts in their retracted position and the seat supported nearer the tree on the sleeves for the inserts to provide unobstructed space and vision for an archer, shown in phantom lines.

Referring more specifically to the drawings, the tree stand is broadly indicated at 10 in FIGS. 1, 2, and 6. The tree stand 10 comprises a foot climber, broadly indicated at 11, and a seat climber, broadly indicated at 12.

The Foot Climber

The foot climber 11 comprises a generally rectangular base frame 13 with tubular frame members 14 and 15 at the sides, welded to a tubular frame member 16 at the front and to a tubular frame member 17 at the rear. A plurality of tubular reinforcing bars 20 extend transversely between the side frame members 14 and 15.

The legs 21 of a generally V-shaped gripper 22 are slidably and removably received in angularly disposed anchor sleeves 23 which are the forward end portions of a generally U-shaped support frame 24. The legs 21 may be adjusted to desired lengths by positioning of bolts 29 in selected bores in the anchor sleeves 23 in registry with bores in the legs 21. The support frame 24 is welded to the side frame members 14 and 15 in surrounding relation to the rear portion of the base frame 13 and in rearwardly spaced relation to the rear frame member 17 of the base frame 13. A pair of upright supports 27 extend upwardly from the sides 14 and 15 of the base frame 13 to the angularly disposed forward end portions 23 of the support frame 24.

A mat 25 of expanded metal overlies and is fixed to the base frame 13 and rear portion of the support frame 24. An elastic strap 26 overlies the mat 25 and one of the reinforcing bars 20 to accommodate a user's feet when climbing. The elastic strap 26 is fastened at its ends to the side frame members 14 and 15 and at its mid-portion to the underlying reinforcing bar 20.

The Seat Climber

The seat climber 12 comprises a U-shaped metal frame comprising with a front frame member 32 and side frame members 33 and 34 extending rearwardly from the front frame member 32. Anchor sleeves 35 and 36 extend forwardly at an angle from the rear portions of the side frame members 33 and 34. The legs 37 and 38 of a second gripper 40 are slidably and releasably received in the anchor sleeves 35 and 36, and may be adjusted to desired lengths by positioning of bolts 39 in selected bores in the anchor sleeves 35, 36 in registry with bores in the legs 37, 38.

The anchor sleeves 35 and 36 are supported by uprights 41 and 42 extending from the juncture of the front frame member 32 with the side frame members 33, 34. A V-shaped gripping plate 43 extends forwardly from the front frame member 32 and is anchored at its ends with the front ends of side frame members 33 and 34.

The foot climber 11 and the seat climber 12 are manipulable by a hunter in a known manner to climb a tree.

The frame members 33 and 34 function as, and are hereinafter referred to as, tubular sleeves 33 and 34 for retractable inserts 44 and 45 that slide easily into the open rear ends of tubular sleeves 33 and 34. As seen in FIGS. 3 and 4, the insert 44 has laterally extending threaded bores 44A and 44B positioned for alignment with unthreaded bores 33A and 33B that extend transversely through the sides of the tubular sleeve 33. Bore 33A in the tubular sleeve 33 is positioned to align with the threaded bore 44A in the insert 44 when the insert 44 is fully retracted in the tubular sleeve 33 (FIG. 4). A bolt 46 is threaded in the bore 44A to hold the retractable insert 44 in its retracted position when the insert 44 is positioned with its threaded bore 44A in registry with the unthreaded bore 33A in the tubular sleeve 33, as in FIG. 4. The bolt 46 is threaded in the bore 44B to hold the retractable insert in its extended position when the insert 44 is positioned with its threaded bore 44B in registry with the unthreaded bore 33B in the tubular sleeve 33, as in FIG. 3.

The tubular sleeve 34 has corresponding bores 34A, 34B and the retractable insert 45 has corresponding threaded bores 44A, 44B and bolts 46.

The threaded bolts 46 are each equipped with a handle 48 that is fastened by a length of plastic line 49 to respective tubular sleeves 33, 34.

A seat, broadly indicated at 50, is supported on the inserts 44, 45 when the inserts are in their fully extended position, as in FIGS. 2 and 3. The seat 50 comprises a tubular rectangular metal frame 51 to which a cushion 52 is permanently attached. The seat frame 51 is removably attached to the retractable inserts 44, 45 when the inserts 44, 45 are in their extended position (FIG. 1), and the seat frame 51 is removably attached to the tubular sleeves 33 and 34 when the inserts 44, 45 are in their retracted position (FIG. 6).

The apparatus for selectively attaching the seat frame 51 to either the tubular sleeves 33, 34 or the retractable inserts 44, 45 comprises anchor rings 53 (FIG. 3) that depend from the seat frame 51 near the tubular sleeves 33, 34. The rings 53 support elastic loops 55 that are selectively engageable with lugs 57 projecting laterally from the sides of the seat frame 51 (FIG. 3).

The apparatus for releasably attaching the seat frame also includes flanged caps 60 that extend upwardly from the free ends of the retractable inserts 44, 45. The rear wall of the frame 51 has slots 62 and 63 (FIG. 2) to receive flanges 64 that extend forwardly from the caps 60 to engage the slots 62, 63 in the rear wall of the seat frame 51 whether the seat 50 is positioned for use on the tubular sleeves 33, 34 or positioned for use on the extended insets 44, 45.

In use, if the seat 50 is positioned on the tubular sleeves 33, 34, as in FIG. 6, the elastic loops 55 are stretched from their anchor rings 53 and wrapped around the tubular sleeves 33, 34 and then hooked on the lugs 57. If the seat 50 is positioned on the extended inserts 44, 45, the elastic loops 55 are stretched from their anchor rings 53 and wrapped around the extended inserts 44, 45 and then hooked on the lugs 57.

Figure 7:
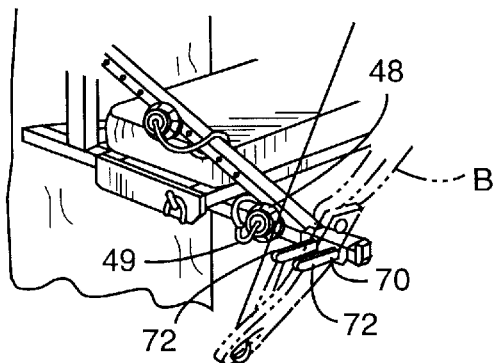
FIG. 7 is a perspective view, with parts broken away, illustrating a bow supported in the bow holder attached to one of the sleeves for the retractable inserts.
Figure 8:
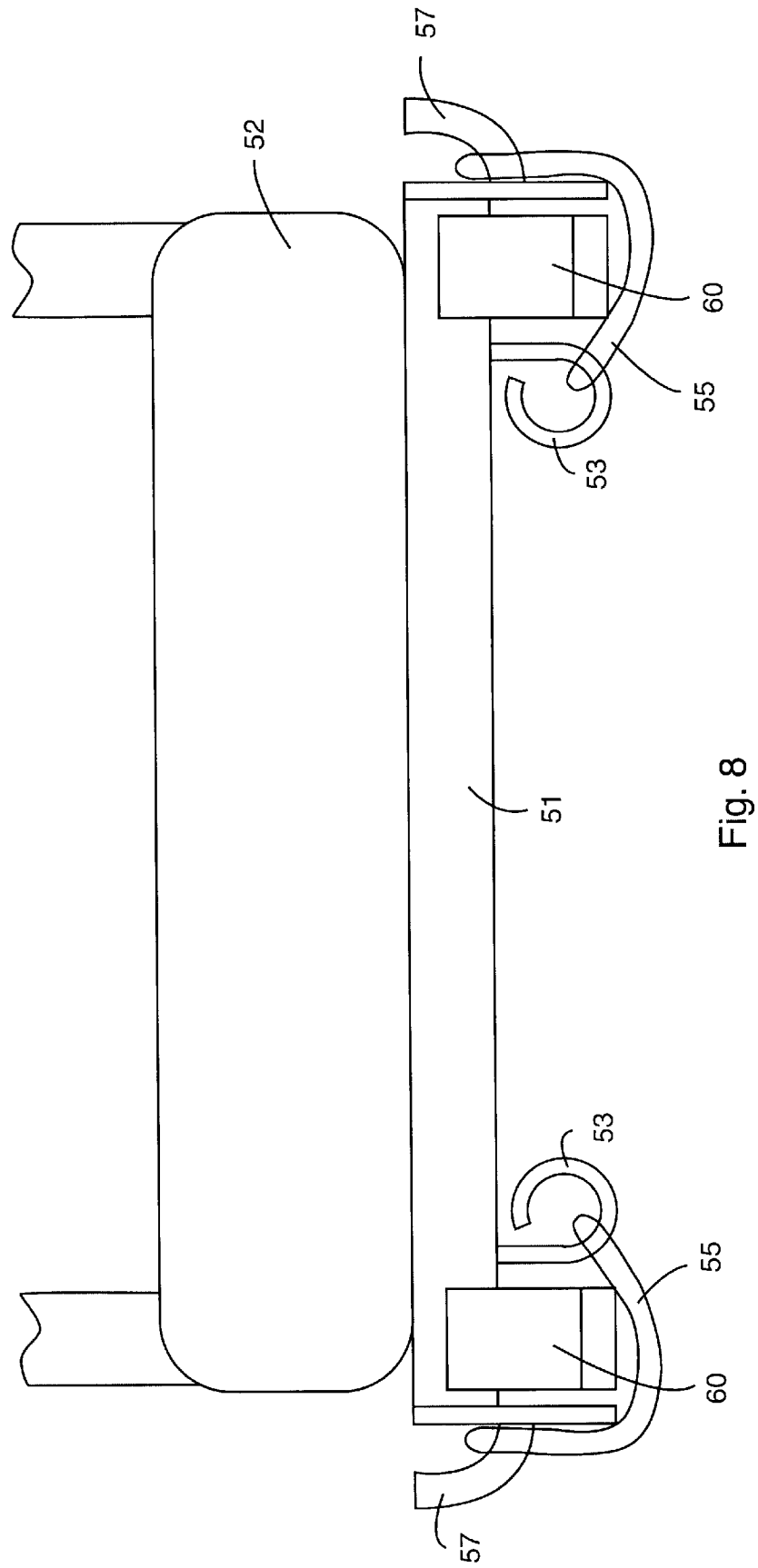
FIG. 8 is a frontal view, illustrating elastic loops stretched from rings depending from the metal frame to lugs extending transversely from the metal frame.

A bow holder 70 (FIG. 5) is attached to the free end portion of the tubular sleeve 33. The bow holder 70 is held in place by its sleeve 71 that fits over the tubular sleeve 33. A pair of fingers 72 extend in horizontally spaced relation to each other from the sleeve 71 to receive and support a hunter's bow, as shown in FIG. 7.

There is thus provided a tree stand with a seat that can be adjusted during use of the tree stand to provide seating and space for hunting with bow and arrow or seating for hunting with a rifle. The seat is available for use in either position.

Although specific terms have been used in describing the invention, they have been used in a generic and descriptive sense only and not for the purpose of limitation, the scope of the invention being defined in the following claims.

I claim:
1. A tree stand comprising:
   a) a foot climber section with a rear end and a front end, foot climber side members with front and rear ends, tree grippers, a frame, and a foot rest extending between said members;
   b) a seat climber section with a rear end and a front end, tree grippers, seat climber tubular side members with front and rear ends forming a first seat support, and inserts slidably positioned in said seat climber tubular side members, said inserts having extended and retracted positions, said inserts forming a second seat support when in the extended position; and
   c) a removable seat releasibly attachable at said second seat support to said inserts when said inserts are in the extended position, and releasibly attachable at said first seat support to said seat climber tubular side members when said inserts are in the retracted position.

2. The tree stand of claim 1, wherein said foot climber further includes a foot strap extending between said side members.

3. The tree stand of claim 1, wherein said foot climber section includes a first foot climber tree gripper extending between the rear ends of said side members, and a second foot climber tree gripper attached to said side members by legs extending rearwardly and upwardly from said frame to said second foot climber tree gripper, said second foot climber tree gripper being to the rear of said first foot climber tree gripper.

4. The tree stand of claim 1, wherein said seat climber section includes a first seat climber tree gripper extending between the rear ends of said side members, and a second seat climber tree gripper attached to said side members by legs extending rearwardly and upwardly from said frame to said second seat climber tree gripper, said second seat climber tree gripper being to the rear of said first seat climber tree gripper.

5. The tree stand of claim 1, wherein said seat climber section further includes attachment means to secure said seat to said inserts and said tubular side-members.

6. The tree stand of claim 1, further including a sleeve extendable over one of said tubular side members, and a pair of parallel bow support fingers extending outwardly from said sleeve.

7. A tree stand comprising:
   a) a foot climber section with a rear end and a front end, foot climber side members with front and rear ends, a frame, a V-shaped foot climber tree gripper extending between the rear ends of said foot climber side members, and a U-shaped foot climber tree gripper attached to said foot climber side members by legs extending rearwardly and upwardly from said frame to said U-shaped foot climber tree gripper, said U-shaped foot climber tree gripper being to the rear of said V-shaped foot climber tree gripper, and a foot rest extending between said members;
   b) a seat climber section with a rear end and a front end, seat climber tubular side members with front and rear ends forming a first seat support, a V-shaped seat climber tree gripper extending between the rear ends of said seat climber tubular side members, and a U-shaped seat climber tree gripper attached to said seat climber tubular side members by legs extending rearwardly and upwardly from said frame to said U-shaped seat climber tree gripper being to the rear of said V-shaped seat climber tree gripper, and inserts slidably positioned in said seat climber tubular side members, said inserts having extended and retracted positions, said inserts forming a second seat support when in the extended position; and c) a removable seat releasibly attachable at said second seat support to said inserts when said inserts are in the extended position, and releasibly attachable at said first seat support to said seat climber tubular side members when said inserts are in the retracted position.

8. The tree stand of claim 7, wherein said foot climber further includes a foot strap extending between said side members.

9. The tree stand of claim 7, wherein said seat climber section further includes attachment means to secure said seat to said inserts and said tubular side members.

10. The tree stand of claim 7, including a sleeve extendable over one of said tubular side member, and a pair of parallel bow support fingers extending outwardly from said sleeve.

11. The tree stand of claim 7, wherein said inserts include front ends having rearwardly extending flanges, and said seat includes a frame having a slotted front side, said flanges being insertable into said slotted front side when said seat is mounted on said inserts.

* * * * *